United States Patent [19]

Davidovits

[11] Patent Number: 4,859,367

[45] Date of Patent: Aug. 22, 1989

[54] WASTE SOLIDIFICATION AND DISPOSAL METHOD

[76] Inventor: Joseph Davidovits, 16 Rue Galilee, F-02100 Saint Quentin, France

[21] Appl. No.: 104,190

[22] Filed: Oct. 2, 1987

[51] Int. Cl.$^4$ .............. G21F 9/16; G21F 9/12; C09D 1/04; C09D 1/02

[52] U.S. Cl. ................. 252/628; 106/76; 106/84; 106/85; 106/89; 106/97; 106/98; 106/104; 106/286.5; 106/286.8; 252/633; 264/42; 264/333; 423/328; 405/128; 405/129; 405/268

[58] Field of Search ............. 252/628, 633; 106/89, 106/76, 38.3, 97, 98, 100, 104, 286.8, 287.1, 287.35, 286.5; 405/128, 129, 266, 267, 268, 269

[56] References Cited

U.S. PATENT DOCUMENTS

| | | | |
|---|---|---|---|
| 3,595,642 | 7/1971 | Miller | 106/104 |
| 4,088,502 | 5/1978 | LaBar | 106/104 |
| 4,090,883 | 5/1978 | Rauschenfels | 106/104 |
| 4,111,711 | 9/1978 | Kiehl et al. | 106/97 |
| 4,132,555 | 1/1979 | Barrable | 106/90 |
| 4,349,386 | 9/1982 | Davidovits | 106/85 |
| 4,362,434 | 12/1982 | Valiga et al. | 405/128 |
| 4,373,956 | 2/1983 | Rosskopf | 106/104 |
| 4,472,199 | 9/1984 | Davidovits | 106/85 |
| 4,509,985 | 4/1985 | Davidovits | 106/84 |
| 4,522,652 | 6/1985 | Neuschaffer et al. | 106/84 |
| 4,533,393 | 8/1985 | Neuschaffer et al. | 106/18.12 |
| 4,536,216 | 8/1985 | Kaluzhsky et al. | 106/104 |
| 4,608,795 | 9/1986 | Neuschaffer et al. | 52/596 |
| 4,640,715 | 2/1987 | Heitzmann et al. | 106/85 |
| 4,642,137 | 2/1987 | Heitzmann et al. | 106/85 |
| 4,652,404 | 3/1987 | Mallek et al. | 252/628 |
| 4,680,279 | 7/1987 | Kleeb | 106/104 |

FOREIGN PATENT DOCUMENTS 199941 12/1986 European Pat. Off. .

OTHER PUBLICATIONS

J. Davidovits, PACTEC '79, pp. 151–154.
J. Davidovits, Ancient and Modern Concretes, What is the Real Difference, in Concrete International, Dec. 1987, U.S.A.
P. Malone, C. A. Randall and T. Kirkpatrick, NTIS Report WES/MP/GL-85-15, 1986.
G. H. Thompson, NTIS Report DP-1389, 1975 and DP-1403, 1976.
G. Scott Barney, NTIS Report ARH-ST-124; C. H. Delegard and G. Scott Barney, ARH-SA-218, 1975.
1986–87 University Catalog, Barry University.
American Chemical Society News Service, Press Release, Apr. 10, 1987.
J. Davidovits and D. Vial, Abstract of the Paper HSIT 38, "Antique Mortar and Antique Man-Made Stone Artefacts".
"Answer into the Tschernobyl Syndrome", 193rd ACS, National Meeting, Denver, Apr. 5–10, 1987.

Primary Examiner—Howard J. Locker

[57] ABSTRACT

The invention provides a new method for solidifying and disposing of waste. The waste is combined and mixed with an alkali-activated silico-aluminate geopolymer binder. The resulting mixture is bound together with a geopolymeric matrix. When allowed to set, it forms a hard, monolithic solid. The mixture is subjected to a suitable engineering process, such as casting or pressing, to produce a waste disposal product having superior long term stability.

12 Claims, No Drawings

WASTE SOLIDIFICATION AND DISPOSAL METHOD

This invention relates to a method for solidifying and disposing waste, particularly solidifying and disposing wastes which are harmful or potentially harmful to man or to the natural environment.

In recent years, considerable attention has been directed to the problem of long term disposal of wastes, particularly wastes which are toxic, radioactive or otherwise incompatible with the natural environment. Such wastes are major by-products of the mining, chemical, petroleum, atomic energy and other industries.

In the mining industry, for example, typically huge amounts of gangue minerals must be mined with the ore. The gangue is usually separated from the ore at a mill close to the mine site and is disposed locally, generally in so-called "tailings impoundments". These impoundments are subject to weathering and ground water seepage, leaking into the surrounding environment. Tailings impoundments from non-metallic mines, such as potash mines, frequently have significant salt concentrations which may be leached over time resulting in high chloride concentrations in surrounding water tables. Tailings impoundments of coal mines and many metallic mines often have high sulfide contents. Weathering and subsequent oxidation can produce sulfuric acid, which seeps into the environment, leaching and carrying toxic heavy metals with it.

In the petro-chemical and atomic energy industries, the hazardous nature of many waste products is even more immediate. There currently exists no completely satisfactory containment technique to prevent leakage of hazardous substances from dump sites for such wastes to the surrounding area.

Long term stabilization of waste deposits, that is, resistance to leaching and leakage, is desired. A number of proposals have been made for stabilizing wastes by solidifying them with binders. However, the conventional binders which have been proposed are associated with a number of problems.

Asphalt, a thermoplastic organic binder, is incompatible with wet wastes, such as sludges and tailings. Such wastes would have to be dried before they could be mixed with the asphalt. Furthermore, mixing operations would have to be carried out at substantially elevated temperatures, in the range of 130°-230° C.

Thermosetting organic polymer binders generally require the presence of some strongly acidic catalyst in order to set. Heavy metals can readily dissolve in such an acid catalyst and escape before being trapped by the solidifying mass during the thermosetting process. Furthermore, the long term effectiveness of many organic polymers is questionable since they are biodegradable.

Conventional inorganic binders similarly are associated with a number of problems. Portland cement, silicate binders and lime-based (pozzolanic) binders are all incompatible with a variety of wastes, including: sodium salts of arsenate, borate, phosphate, iodate and sulfides; salts of magnesium, tin, zinc, copper and lead; some silts and clays; and coal and lignite. These wastes cause problems with setting, curing and durability of the mixtures. Furthermore, these binders are often vulnerable to acid leaching solutions. High concentrations in oxidized sulfides can result in decomposition of the fixed material and accelerated leaching of the hazardous elements.

Solidification of certain hazardous wastes with Portland cement or other conventional inorganic binders is currently used though, particularly for solidifying liquid radio-active wastes, which may not legally be transported in the U.S. without first being solidified. However, these solidification techniques should be recognized as having been developed to render such wastes more convenient and safe for transportation, not to provide the necessary stability for long term disposal.

It is an object of the present invention to obviate or mitigate the disadvantages associated with the known waste solidification and disposal methods.

In accordance with the present invention, a method is provided for solidifying and disposing waste, comprising the steps of combining and mixing the waste with an alkali-activated silico-aluminate geopolymer binder, in proportion such that a mixture is made having a geopolymeric matrix, forming a monolithic solid when allowed to set, and subjecting said mixture to a suitable engineering process so as to produce a waste disposal product having archaeological long term stability. Preferably, the waste and the binder are combined in proportion such that the molar ratio $Al_2O_3$: $Na_2O+K_2O$ of said mixture is in the range of about 1.5 to 4.0. The method of the present invention is compatible with a wide variety of wastes and produces a solidified waste product having superior strength and long term stability.

In this specification, the term "alkali-activated silico-aluminate geopolymer binder" (or simply "geopolymer") refers to an inorganic binding material comprising alumino-silicate oxide ($Si_2O_5$, $Al_2O_2$). Alumino-silicate oxide differs from common alumino-silicate ($2SiO_2$, $Al_2O_3$) by the fact that the cation Al is in four-fold coordination. This alumino-silicate oxide can be produced by calcination of kaolin, or of minerals containing kaolinitic species, such as bauxite, and has also been found in alumina-rich waste fumes and very high temperature fly ashes. Preparation and use of these geopolymer binders is described in detail in the inventor's earlier patents, particularly U.S. Pat. Nos. 4,349,386, 4,472,199, 4,509,985, 4,522,652, 4,533,393, 4,608,795, 4,640,715, 4,642,137, West German Patent DE No. 3,512,515 and European Patent EP No. 199,941, the disclosures of which are incorporated by reference. These geopolymer binders were developed for use in preparing high strength masonry products, such as tiles. However, it has now been found that these geopolymer binders are also particularly effective in solidifying wastes for disposal with archaeological long term stability.

Combining and mixing a waste with sufficient alkali-activated silico-aluminate geopolymer binder produces a mixture having a geopolymeric matrix of the poly(sialate) (—Si—O—Al—O—) and/or poly(sialate—siloxo) (—Si—O—Al—O—Si—O—) types, having zeolitic properties associated with long term stability. These geopolymers are closely related to natural and synthetic zeolites and feldspathoids and accordingly, can immobilize major hazardous elements. Such hazardous species as arsenic, cadmium, chromium, mercury, lead, barium, sulphur, cyanide, sulfides and radioactive elements become trapped within the three dimensional silico-aluminate framework. Additionally, geopolymers act as a binder to convert semi-solid waste into an adhesive, monolithic solid. Both of these properties make geopolymeric solidification an attractive method for disposal of hazardous or potentially hazardous wastes.

Furthermore, these geopolymer binders produce a solidified structure having weathering characteristics far superior to those of modern Portland cement. Comparative studies of modern restorations performed on archaeological buildings dating from the Roman time show that modern Portland cement is strongly affected by weathering and typically does not remain stable beyond about fifty years. The Roman cements, however, remain largely unaffected by weathering even after more than 2,000 years. Studies have demonstrated that the pozzolanic formulation used by the Romans involved a setting similar to those of alkali-activated silico-aluminate geopolymer binders.

The inventor has elsewhere described how archaeological studies show that ancient mortars comprise a geopolymeric matrix of the analcine, philipsite or sodalite type: "Are Modern Cements Better Than Ancient Cements"; Structural Survey, November 1986, London, U.K. The calcite ($CaCO_3$) which results from the carbonation of lime (CaO) acts as an inert filler and is embedded in this geopolymeric matrix. Chemical analysis of these blended geopolymer-lime mortars and cements provides data on the alkali-activation, or geopolymerization, by the oxide molar ratio $Al_2O_3$: $Na_2O + K_2O$. Characteristic values of this ratio for ancient Greek cements (c. 360–300 B.C.) are in the range of 1.83 to 3.77, for ancient Roman cements (c. 160–140 B.C.) in the range of 2.08 to 2.14, and for ancient Syrian cements (c. 7000 B.C.) approximately 1.92. From these data it has been found that the long term stability of geopolymer binders is a function of the ratio $Al_2O_3$: $Na_2O + K_2O$ and that this ratio should preferably be in the range of 1.5 to 4.0 in order to provide archaeological long term stability.

In addition to long term stability, the geopolymer binders represent other advantages. Tensile strength of these geopolymer binders is twice to three times that of Portland cement. Setting time can be as fast as 5 minutes. Potassium-polysiliate type geopolymers are highly freeze-thaw resistant. Both poly(sialate) and poly(sialate-siloxo) type geopolymers can be foamed by subjecting to blowing to produce an open-celled, highly resistant zeolithic structure.

Waste-geopolymer mixtures can be allowed to set at room temperature, although setting is accelerated at elevated temperatures in the range of 40°–90° C. Enhanced hardening can also be carried out by allowing the mixture to set under applied pressure at an elevated temperature in the range of 95°–180° C.

In some circumstances, it may be possible to mix these geopolymer binders with conventional inorganic binders for waste solidification.

For disposal, the waste-geopolymer mixture is subjected to engineering process, such as casting, pressing or pulping according to known techniques to produce a waste disposal product. Solidified waste-geopolymer mixture may be used as a lining or cap or other barrier for waste impoundments.

In order that the invention may be more fully understood, the following examples are given for the purpose of illustration, but they should not be considered as limiting in any way the full scope of the invention as defined by the claims. In the examples, all percentages and parts are measured by weight, unless otherwise indicated.

EXAMPLE 1

This example shows the effectiveness of geopolymer solidification on stabilization of mine tailings. Tailings samples from four different types of mines were tested: base metal, potash, coal and uranium.

The geopolymer binder tested was GEOPOLYMITE 50 (trade mark), which is a commercially available geopolymer manufactured by Geopolymere S.A.R.L., a French company. GEOPOLYMITE 50 consists of two parts, A and B, which are combined in equal proportions just prior to use. Part A is liquid and part B is in powder form. The chemical analyses of the two parts is shown in Table I.

TABLE I

| CHEMICAL ANALYSIS OF GEOPOLYMITE 50 | | |
|---|---|---|
|  | Part A | Part B |
| $SiO_2$ | 20.95 | 30.22 |
| $Al_2O_3$ | — | 25.30 |
| $Fe_2O_3/TiO_2$ | — | 1.10 |
| $K_2O$ | 25.98 | 0.63 |
| CaO | — | 29.00 |
| MgO | — | 2.76 |
| $F^-$ | — | 10.94 |
| $H_2O$ | 53.03 | — |
| Total | 99.96 | 99.95 |

The tailings samples were high in water content and therefore were first blended with sand to aid in obtaining a desirable slurry density for the waste-geopolymer mixture. The sand was combined with the four tailings samples in the proportion of 50 parts sand and 32.5 parts of tailings.

Separately, four batches of 8.75 parts of GEOPOLYMITE 50 Part A and 8.75 parts of GEOPOLYMITE 50 Part B were combined and blended. After 30 minutes of maturation, the four batches of blended GEOPOLYMITE 50 were added to the four batches of blended tailings and sand and mixed therewith. The four tailings-geopolymer mixtures were then cast into molds and vibrated to remove entrained air. The cast mixtures were then placed in plastic bags and allowed to set overnight at ambient temperatures. The resulting waste disposal products were subsequently demolded and allowed to cure, being tested for stability, that is resistance to leaching, after 14 days and again after 21 days.

The stability of the tailings-geopolymer waste disposal products was tested according to the procedure Leachate Extraction Procedure established by the Province of Ontario, Canada, Ministry of Environment in Regulation 309, R.R.O. 1980, as amended by O. Reg. 464/85, under the Environmental Protection Act, R.S.O. 1980. This procedure includes crushing the sample to pass a 9.5 mm mesh sieve, holding in a solution of acetic and nitric acids for 24 hours, extracting the eluate, filtering and analyzing the filtrate. The results are shown in Table II.

TABLE II

| LEACH TEST RESULTS ON TAILINGS-GEOPOLYMER PRODUCTS | | | | | | | |
|---|---|---|---|---|---|---|---|
| Tailings Sample | Period to Cure (Days) | Elements(mg/L) | | | | | $^{226}Ra(pCi/L)$ |
|  |  | B | Cd | Cr | Pb | Ba |  |
| Coal | 14 | 0.13 | 0.002 | 0.01 | 0.02 | 0.29 | — |
|  | 21 | 0.17 | 0.002 | 0.01 | 0.02 | 0.32 | — |
| Potash | 14 | 0.02 | 0.002 | 0.01 | 0.02 | 0.12 | — |
|  | 21 | 0.15 | 0.002 | 0.01 | 0.02 | 0.10 | — |
| Base | 14 | 0.02 | 0.014 | 0.01 | 0.02 | 0.13 | — |

TABLE II-continued

LEACH TEST RESULTS ON TAILINGS-GEOPOLYMER PRODUCTS

| Tailings Sample | Period to Cure (Days) | Elements(mg/L) | | | | | $^{226}Ra(pCi/L)$ |
|---|---|---|---|---|---|---|---|
| | | B | Cd | Cr | Pb | Ba | |
| Metal | 21 | 0.07 | 0.016 | 0.01 | 0.02 | 0.14 | — |
| Uranium | 14 | 0.06 | 0.002 | 0.01 | 0.02 | 0.03 | 21.9 |
| | 21 | 0.11 | 0.002 | 0.01 | 0.02 | 0.028 | 18.7 |

The mine tailings comprise a silico-aluminate gangue with $Al_2O_3$ content varying in the range of about five percent to ten percent by weight. Fine dispersed silico-aluminate particles of the tailings are believed to be involved in the geopolymerization process. In the resulting geopolymeric matrix, the molar ratio $Al_2O_3$: $Na_2O+K_2O$ is in the range of about 1.63 to 2.43 and provide archaeological long term stability.

EXAMPLE 2

This example shows the effectiveness of geopolymer solidification of liquid toxic waste. A liquid waste solution was prepared by adding to one liter of water the following: 5.20 gm arsenite, 10.7 gm cadmium nitrate trihydrate, 14.00 gm chromium chloride (45 percent sol.), 13.20 gm lead nitrate, and 3.80 gm phenol. To this liquid waste solution was added 220 gm of waste silica fume (90 percent $SiO_2$) and 340 gm of potassium hydroxide flakes (90 percent KOH). Japanese patents JP 74134599 and JP 75150699, the disclosures of which are incorporated by reference, disclose that the fabrication of waterglass (alkalipolysilicate) can be achieved with ferrosilicon waste silica fume.

The blended waste solution and polysilicate was mixed with the Part B portion of GEOPOLYMITE 711 (trade mark), which is a commercially available geopolymer manufactured by Geopolymere S.A.R.L., a French company. The chemical analysis of the resulting waste-geopolymer mixture is shown in Table III.

TABLE III

CHEMICAL ANALYSIS OF LIQUID WASTE - GEOPOLYMITE 711 PART B MIXTURE

| $SiO_2$ | 31.52 |
|---|---|
| $Al_2O_3$ | 16.79 |
| $Fe_2O_3/TiO_2$ | 1.08 |
| $K_2O$ | 11.19 |
| CaO | 5.15 |
| $F^-$ | 6.76 |
| $H_2O$ | 27.76 |

The mixture was placed in a mold and cured at 60° C. for a period of four hours. The mixture became a hardened mass during the four hour period. Testing performed 14 days later yielded compressive strength results in the range of 4,000 to 6,000 psi. The molar ratio $Al_2O_3$: $K_2O$ of the hardened geopolymer matrix was 1.38.

I claim:

1. A method for toxic mine tailings disposal, comprising:
    (a) preparing a concrete mixture by adding to the toxic mine tailings a mineral binder selected from the class of alkali-activated silico-aluminate geopolymers, to form a geopolymeric matrix of the poly(sialate) (—Si—O—Al—O—) and/or poly(sialate-siloxo) (—Si—O—Al—O—Si—O—) types, providing zeolitic properties associated with long-term durability as exemplified by archaeological records;
    (b) subjecting said concrete mixture to an engineering process involving casting or pressing, to form a raw tailing disposal product;
    (c) hardening said raw tailing disposal product to form an environmentally safe disposal product associated with archaeological long-term durability.

2. The method of claim 1, wherein in said geopolymeric matrix the molar ratio of oxides $Al_2O_3/M_2O$ is in the range of 1.5 to 4.0, where M is selected from the group consisting of sodium, potassium, and mixtures of sodium and potassium.

3. The method of claim 2, wherein said oxide $M_2O$ is provided by sodium hydroxide (NaOH), potassium hydroxide (KOH) and mixtures of KOH and NaOH or products producing NaOH and/or KOH, in said concrete mixture.

4. The method of claim 2, wherein said oxide $M_2O$ is provided by water soluble alkali silicates or products producing water soluble alkali silicates when reacting with NaOH and/or KOH, in said concrete mixture.

5. The method of claim 2, wherein said oxide $Al_2O_3$ is provided by an aluminosilicate oxide with the cation Al in 4-fold coordination, in said mineral binder.

6. The method of claim 2, wherein said oxide $Al_2O_3$ is provided by clay, in said toxic mine tailing.

7. The method of claim 6, wherein said clay is of the kaolinitic type.

8. The method of claim 6, wherein hardening is obtained by applying simultaneously pressure and temperature, said temperature being in the range of 95° C. to 180° C.

9. The method of claim 1, wherein said engineering process involves the addition of a blowing agent to produce a foamed raw tailing disposal product.

10. The method of claim 1, wherein said engineering process involves the fabrication of elements constituting a synthetic geochemical barrier for use as a capping or a lining material.

11. The method of claim 2, wherein said engineering process involves the fabrication of elements constituting a synthetic geochemical barrier for use as a capping or a lining material.

12. The method of claim 6, wherein said engineering process involves the fabrication of elements constituting a synthetic geochemical barrier for use as a capping or a lining material.

* * * * *